Feb. 24, 1953 C. E. HUNT, JR 2,629,777
PHASING CLUTCH FOR FACSIMILE RECEIVERS
Filed Nov. 4, 1950
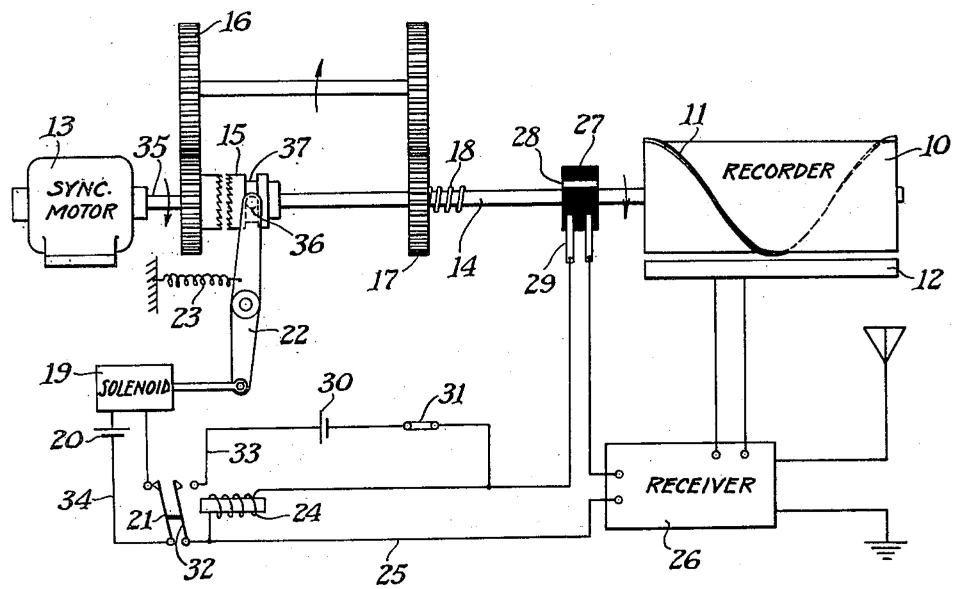
CLAYTON E. HUNT, JR.
INVENTOR
BY Daniel J. Mayne
Frank R. Gollon
ATTORNEYS Patented Feb. 24, 1953 2,629,777

UNITED STATES PATENT OFFICE 2,629,777

PHASING CLUTCH FOR FACSIMILE RECEIVERS

Clayton E. Hunt, Jr., Rochester, N. Y., assignor to Eastman Kodak Company, Rochester, N. Y., a corporation of New Jersey Application November 4, 1950, Serial No. 194,132

9 Claims. (Cl. 178—69.5)

This invention relates to remote control facsimile systems and in particular to a phasing clutch for facsimile receivers.

In the art of facsimile reproduction, the copy which is to be reproduced at a distant point is scanned point-by-point and line-by-line and reproduced in a similar manner. In order that the reproduction may be an exact facsimile of the original, it is necessary that the rate of travel of the printing point in the recorder be exactly the same as that of the light spot in the scanner and that the start of the recorder be in phase with the start of the scanning line at the transmitter. The first involves the problem of speed control. Where the scanner and receiver are positioned side-by-side in close proximity, as in facsimile duplicators such as office copy machines, the scanning unit and the recording unit may be mechanically interconnected so that the scanning and printing mechanisms are always driven at identical speeds and no problem exists in this respect. But where the scanning and recording units are remotely positioned relative to each other, the transmission of signals from the scanner to the receiver will be dependent upon wire or radio transmission and the drives for the scanner and recorder may or may not be energized by the same power system. Where the latter is the case and where the frequencies of the power circuits energizing the scanning and recorder drives may independently vary and fluctuate, there is a need for some form of synchronizing device to maintain the rates of travel of the scanning point and the printing point in synchronization. Such devices are well known in the art. But where both the sending machine and the remotely operated receiving machine are operated with synchronous motors driven from common or interconnected power systems, the scanning and printing units are driven in perfect and unvarying synchronization, which requires no additional apparatus in the receiver whatsoever.

However, even under the latter circumstances, some means must be provided to make the recorder start in phase with the start of the scanning line at the transmitter. This is commonly known as having the recorder in "frame" with the scanner. Even though the scanning and recording units are being driven at exactly the same or in synchronous speed, if they are not in frame, the border of the recorded picture or intelligence will be misplaced. The recorder unit must start scanning each line at the same time the scanner is starting to scan the corresponding copy line or the border of the recorded picture or intelligence will be somewhere between the two edges of the paper instead of at the edge of the paper. Framing and synchronizing become related problems when the framing controls the speed of the recorder, as is the case in certain facsimile systems. But where the problem of synchronization is independent of the framing, the two problems are separate and are treated separately. The latter is generally the case in most commercial systems in use today. The present invention is directed to a device for framing or phasing the receiver or recorder independent of the problem of synchronization. In the device described herein synchronization is obtained by the use of synchronous motors, energized from common or interconnected power systems, which drive both the scanning and printing units even though these may be remote from each other.

According to the present invention, a synchronous motor is adapted to drive the recorder through a gear train at a speed slightly different from synchronous speed. In addition, a positive clutch connection between the motor and the recorder permits the motor to drive the recorder at synchronous speed independent of the gear train when said clutch is closed or engaged, the drive through the gear train being automatically rendered ineffective when the clutch is closed, through the use of an overrunning clutch or equivalent mechanism which couples the output of the gear train to the recorder. The clutch itself is actuated through means, which includes a solenoid, the operation of which is controlled by a circuit which is responsive to synchronizing or phasing signals received from the transmitter. The recorder moving at slightly different than synchronous speed, when initially driven through the gear train, drifts relative to the scanner until such time as scanner and recorder are in proper phase whereupon the synchronizing or phasing signal is received by the said circuit which it energizes and which circuit in turn controls the operaton of the clutch-operating means to instantaneously engage the positive clutch, whereupon the motor is caused to drive the recorder at synchronous speed independent of the gear train coupling. Such a device as described is especially useful in synchronizing and phasing high speed recorders since these operations are performed only after the recorder has been brought up to somewhere near synchronous speed. Since, too, the phasing signals are received as intermittent pulses, the circuit includes locking means to maintain the positive clutch engaged even after the circuit is no longer energized by the reception of the pulse. This framing or phasing process is carried out only at the beginning of recording, the recorder being then maintained in phase with the transmitter scanner by the synchronous motors which drive both the scanning and recording mechanisms.

An object of the present invention is to provide a new and improved means for phasing the operation of the recorder with that of the scanner whereby the picture or intelligence being reproduced is properly framed.

Another object of this invention is to provide a device of the character described which is especially adapted to the synchronization and phasing of high speed facsimile recorders.

Still another object of this invention is to provide a device of the character described in which the phasing is automatically accomplished by the reception of pulses intermittently generated by the transmitter and received by the recorder.

Still another object of this invention is to provide a device of the character described in which means are employed by which the recorder is continuously driven at synchronous speed after it has been properly phased, even after the termination of reception of the phasing pulse.

Other objects and advantages of the invention will become apparent from the following description taken in connection with the accompanying drawing, and it will be understood that many changes may be made in the details of construction and arrangement of parts shown and described without departing from the spirit of the invention as expressed in the accompanying claims. I, therefore, do not wish to be limited to the exact details shown and described as the preferred form only has been shown by way of illustration.

The drawing illustrates in somewhat diagrammatic form the preferred form of my phasing clutch for a facsimile recorder and the circuit by which the clutch-operating means is actuated.

In the drawing the recorder 10 is of the drum type having a raised scanning helix 11 thereon, the drum cooperating with a printing bar 12 which is magnetically actuated by signals received from the transmitter. The paper passing between the drum and printing bar receives markings thereon when the bar is caused to strike the drum. Such a device is commonplace in the facsimile art and forms no part of this invention. The recording drum is rotated by means of the synchronous motor 13 which drives the drum shaft 14 through a positive clutch mechanism 15, which will be more fully described below. Before the clutch is engaged, the synchronous motor is adapted to drive the drum shaft 14 and the drum secured thereto through a gear train 16. This train of gears is so designed that the synchronous motor will tend to rotate the drive shaft 14 therethrough at about 95 per cent synchronous speed. It is obvious that when the recorder is driven at somewhat less than synchronous speed, the recorder will tend to drift relative to the transmitter scanning unit, the reason for which will become subsequently apparent. The last gear 17 in the gear train 16 is freely mounted upon the drum shaft 14 which it is capable of driving in one direction through the medium of the overrunning clutch 18. This clutch comprises a helical spring, loosely though closely wound upon the shaft 14, one end of the spring being secured to the gear 17, the other end being free. Thus, when the gear 17 is rotated clockwise (looking along the shaft from the motor toward the drum), the clutch spring will tighten upon the shaft and rotate said shaft with the gear 17. However, after the positive clutch 15 has been engaged, the motor will rotate the shaft 14 through its direct connection thereto at a slightly higher speed than it would rotate this shaft through the gear train, with the result that the spring of the overrunning clutch 18 becomes loose upon the shaft and the gear train 16 becomes ineffective to drive the recording device. Although I have described my overrunning clutch to be of the helical-spring type, it is apparent that any number of other well-known clutches of this kind may be used with equally satisfactory results.

The positive clutch 15 is ordinarily retained in an unengaged position by the action of the energized solenoid 19. This solenoid is energized by the battery 20 in the solenoid circuit 34 and until the switch 21 is opened the solenoid 19 continues to hold the clutch 15 open or unengaged. However, upon the opening of the switch 21 the tension spring 23 acts upon the pivoted lever 22 to engage the clutch 15, the solenoid no longer functioning to retain the clutch in its unengaged position against the action of the spring 23.

The switch 21, which is spring biased to hold it closed for reasons which will be later apparent, is adapted to be opened against its bias by the energizing of the solenoid 24 in the circuit 25 which is adapted to receive synchronizing or phasing pulses from the transmitter through the receiver 26. These pulses are generated by the transmitter whenever the rotating scanning drum arrives at a predetermined degree of orientation. The circuit 25 is intermittently connected to the receiver 26 through the ring 27 which is secured to and rotatable with the drum shaft 14. The ring 27 is formed of nonconducting material having a conducting segment 28 thereon so that with every rotation a pair of brushes or contact members 29 make contact with the segment to momentarily connect the circuit to the receiver. If at the moment that such contact is made a pulse is received by the receiver from the transmitter, the solenoid 24 in circuit 25 is energized thereby, which in turn opens switch 21 to deenergize solenoid 19, whereby spring 23 closes the clutch 15 through operation of the lever 22. By properly orienting the ring 27 relative to the recording drum 10 so that the brushes 29 make contact with the conducting segment when the recorder drum is rotated to a position corresponding to the predetermined orientation of the scanning drum at the transmitter, at which instant a pulse is generated by the transmitter and the two drums are in phase, the recording drum will be caused to begin to rotate at synchronous speed by the engaging or closing of the clutch 15, as described. Since the two thereafter rotate or are driven at synchronous speed, the recorder remains in continuous phase with the scanner and the picture or intelligence which is being reproduced is properly framed.

Since the phasing pulse is intermittently generated and the circuit 25 is closed only momentarily once each revolution of the ring 27, some means must be provided to maintain the solenoid 24 energized after the discontinuation of the pulse which has energized the solenoid 24. Otherwise the spring-biased switch 21 will close upon the deenergizing of the solenoid 24 and the solenoid would again disengage the clutch 15. The locking means which I employ to continue the energizing of the solenoid 24 after termination of the pulse is an auxiliary circuit 33 which includes the battery 30, a hand-operated switch 31 and a second switch 32 which is mechanically linked to the switch 21 to move in unison therewith upon the energizing of the solenoid 24. The switch 31 is closed before operation of the recorder is begun and it is apparent from an inspection of the drawing that the energizing of the solenoid 24 by the reception of a pulse in the circuit 25 will not only open the switch 21 but close the switch 32. The closing of the latter completes the circuit 33 and thereafter battery 30 serves to continue to energize solenoid 24 even after termination of the phasing pulse in circuit 25. After the recording is completed, it is necessary to manually open switch 31 to deenergize solenoid 24 to release switches 21 and 32 which, due to the above-mentioned spring bias of the switch 21, return to the position illustrated in the drawing in preparation for the next operation of the recorder.

Although I have shown for the sake of simplicity the circuits 33 and 34 as including the batteries 20 and 30, in practice the latter would be replaced by transformers and the same source of current which drives the motor would serve to energize the circuits 33 and 34. With such an arrangement the switch 31 in circuit 33 can be dispensed with and a master switch substituted in the connection to the power line, whereby the closing of this switch would simultaneously start the motor and serve to energize both the circuits 33 and 34. Upon completion of a recording, the opening of this master switch will both stop the motor and deenergize the circuits 33 and 34 to release the switches 21 and 32 in the same fashion as the opening of the hand switch 31 would accomplish, as described above.

Upon starting the motor, the clutch 15 being initially open or disengaged, the drum shaft will be rotated through the gear train 16 and overrunning clutch 18 at 95 per cent synchronous speed. This being slightly less than the speed at which the drum mounting the copy at the transmitter is operating, the recorder drum will drift relative to the drum being scanned until such time as a pulse is received from the transmitter simultaneously with the conducting segment 28 making contact with the brushes 29, whereupon the recorder drum will be in exact phase with the drum being scanned and the clutch 15 will be closed and maintained engaged by the operation of the several solenoids, as previously described. The motor 13 will now continue to drive the recorder drum directly through the clutch 15 and since the drive shaft 14 is now rotating at somewhat greater speed than that which the gear train 16 tends to drive it, the spring clutch will loosen upon the shaft 14 and become ineffective to drive it. The gears in the gear train will, of course, continue to rotate but the spring clutch will merely slip on the drum shaft, imparting no rotation to it.

The positive clutch 15 comprises two sawtooth elements, one of which is fixed to the motor shaft 35, the other fixed against rotation, though longitudinally slidable, on the drum shaft 14. The lever 22, which is adapted to slide the second clutch element into engagement with the first, engages the slidable element by means of a pin 36 at the end of the lever, which rides in the groove 37 formed in this second clutch element. To provide exact phasing for every possible orientation of the motor armature, the clutch elements are each provided with a number of teeth equal to the number of poles in the synchronous motor 13. Thus, for a motor operating at 300 R. P. M. upon a 60-cycle power line, a clutch having 24 teeth per clutch element will produce exact phasing.

While I have described the preferred form of my apparatus, it is apparent that many changes may be made therein which fall within the scope of my invention. For example, instead of having the clutch 15 held open by an energized solenoid, I may cause the energizing of the solenoid to engage or close the clutch. Thus, the solenoid 24 could be made to act directly upon the clutch to close it without the use of the intermediate circuit 34, although this would require additional amplification of the pulse to actuate the clutch which has considerably more inertia than an element such as the switch 32.

Again, although I describe the gear train 16 as driving the recorder shaft at somewhat less than synchronous speed, a similar train could be employed to drive it at somewhat more than synchronous speed and the mechanism which closes the clutch 15 could be designed to simultaneously render the gear train ineffective to drive the recorder shaft 14 as, for example, by disengaging a second clutch positioned somewhere in the gear train. It is only necessary that the gear train drive the recorder at a speed slightly different than the speed at which the motor drives the recorder through the clutch 15, in order that the recorder drum may be caused to drift relative to the scanning drum until the two are in phase.

Instead of employing a recorder drum having a raised helical rib thereon, as illustrated, the recorder, and the scanner at the transmitter as well, may take the form of a belt mounting one or more styli thereon and driven by pulleys, which is commonplace in the facsimile art. Inasmuch as styli belts of different lengths may be employed at the transmitter and in the recorder to produce reproductions differing in size from the original copy, the shafts driving the pulleys which in turn drive the belts at the transmitter and at the recorder may rotate at two different speeds. Under such circumstances, the motor 13 will not finally drive the recorder shaft at the same speed as the drive shaft for the scanner at the transmitter operates, but rather at some constantly proportionate or synchronous speed.

From the foregoing description, it will be apparent that I have provided means for obtaining all the objects and advantages of this invention.

What I claim and desire to secure by Letters Patent of the United States is:

1. In a facsimile recorder, means for receiving facsimile and phasing signals from a transmitter which operates at a known speed, a recording device, a drive shaft coupled to the recording device, a motor adapted to drive the recording device through said drive shaft at said known speed, means including a gear train and an overrunning clutch for connecting the motor to the drive shaft and adapted to drive the recording device at slightly less than said known speed, a positive clutch for coupling the motor to the drive shaft to drive the recording device at said known speed, means including a solenoid for actuating said positive clutch, a circuit responsive to phasing signals for controlling operation of the solenoid, means movable with the recording device for momentarily connecting the phasing signal receiver to said circuit whenever the recording device passes a certain point in its cycle, whereby the circuit will, through its control of the operation of the solenoid, cause said positive clutch to be closed when said certain point is being passed while a phasing signal is being received, and means for maintaining the positive clutch closed after the recording device has passed said certain point.

2. In a facsimile recorder, means for receiving facsimile and phasing signals from a transmitter which operates at a known speed, a recording device, a synchronous motor, means coupling said motor to the recording device whereby the latter is driven at slightly less than said known speed, said coupling means including an overrunning clutch, a positive clutch for coupling the motor to the recording device independent of said first coupling means whereby the recording device is driven at said known speed, means including a solenoid for actuating said positive clutch, a circuit responsive to phasing signals for controlling operation of the solenoid, and means movable with the recording device for momentarily connecting the phasing signal receiver to said circuit whenever the recording device reaches a predetermined position in its travel, whereby the circuit will, through its control of the operation of the solenoid, cause said positive clutch to be closed when said predetermined position is reached while a phasing signal is being received.

3. In a facsimile recorder, means for receiving facsimile and phasing signals from a transmitter which operates at a known speed, a recording device, a shaft for driving the recording device, a motor adapted to drive the recording device through said drive shaft at said known speed, means coupling said motor to the drive shaft and adapted to drive the recording device at slightly less than said known speed, said coupling means including an overrunning clutch, a positive clutch for coupling the motor to the drive shaft independent of said first coupling means whereby the recording device is driven at said known speed, means including a solenoid for actuating said positive clutch, a circuit responsive to phasing signals for controlling operation of the solenoid, means rotatable with said drive shaft for momentarily connecting the phasing signal receiver to said circuit at a predetermined angular position of said rotatable means, whereby the circuit will, through its control of the operation of the solenoid, cause said positive clutch to be closed when the rotatable means is at said predetermined angular position while a phasing signal is being received, and means for maintaining the positive clutch closed after the rotatable means has reached and passed said predetermined angular position.

4. In a facsimile recorder, means for receiving facsimile and synchronizing signals from a transmitter which operates at a known speed, a recording device, a synchronous motor, means including a gear train and an overrunning clutch for connecting the motor to the recording device whereby the recording device is driven at slightly less than said known speed, a positive clutch for coupling the motor to the recording device independent of said latter means whereby the recording device is driven at said known speed, means including a solenoid for actuating said positive clutch, a circuit responsive to synchronizing signals for controlling operation of the solenoid, a nonconducting ring secured to and rotatable with the recording device and having a conducting segment thereon, and a pair of contact members riding on said ring and adapted to momentarily connect the synchronizing signal receiver to said circuit when said contact members make contact with the conducting segment as the ring rotates, whereby the circuit will, through its control of the operation of the solenoid, cause said positive clutch to be closed when said contact with the conducting segment is made while a synchronizing signal is being received.

5. In a facsimile recorder, means for receiving facsimile and synchronizing signals from a transmitter which rotates at a known speed, a recording device, a synchronous motor, means including a gear train and an overrunning clutch for connecting the motor to the recording device whereby the recording device is rotated at less than said known speed, a positive clutch for coupling the motor to the recording device independent of said latter means whereby the recording device is rotated at said known speed, means for operating said positive clutch, a circuit responsive to synchronizing signals for controlling operation of said latter clutch-operating means, means movable with the recording device for momentarily connecting the synchronizing signal receiver to said circuit whenever the recording device reaches a predetermined position in its travel, whereby the circuit will, through its control of said clutch-operating means, cause the positive clutch to be closed when said predetermined position is reached while a synchronizing signal is being received, and means for maintaining the positive clutch closed after the recording device has reached and passed said predetermined position.

6. In a facsimile recorder, means for receiving facsimile and synchronizing signals from a transmitter which is driven at a known speed, a recording device, a motor, a positive clutch for coupling the motor to the recording device to drive the latter at a speed synchronous with that of the transmitter, means including a gear train for coupling the motor to the recording device whereby the latter is driven at slightly different than said synchronous speed, means for automatically rendering said gear train coupling ineffective to drive the recording device when said positive clutch is engaged, means including a solenoid for actuating the positive clutch, a circuit responsive to synchronizing signals for controlling operation of the solenoid, means movable with the recording device for momentarily connecting the synchronizing signal receiver to said circuit whenever the recording device reaches a predetermined position in its travel, whereby the circuit will, through its control of the operation of the solenoid, cause said positive clutch to be engaged when said predetermined position is reached while a synchronizing signal is being received, and locking means in said circuit for maintaining the positive clutch engaged after the recording device has reached and passed said predetermined position.

7. In a facsimile recorder, means for receiving facsimile and synchronizing signals from a transmitter which is driven at a known speed, a recording device, a motor, a positive clutch for coupling the motor to the recording device to drive the latter at a speed synchronous with that of the transmitter, means including a gear train and an overrunning clutch for connecting the motor to the recording device whereby the latter is driven at slightly less than said synchronous speed when the positive clutch is disengaged, means including a solenoid for actuating the positive clutch, a circuit responsive to synchronizing signals for controlling operation of the solenoid, and means movable with the recording device for momentarily connecting the synchronizing signal receiver to said circuit whenever the recording device reaches a predetermined position in its travel, whereby the circuit will, through its control of the operation of the solenoid, cause said positive clutch to be engaged when said predetermined position is reached while a synchronizing signal is being received.

8. In a facsimile recorder, means for receiving facsimile and synchronizing signals from a transmitter which is driven at a known speed, a recording device, a motor, a positive clutch for connecting the motor to the recording device to drive the latter at a speed synchronous with that of the transmitter, means coupling the motor to the recording device independent of said positive clutch and adapted to drive the recording device at slightly different than said synchronous speed, means for automatically rendering said coupling means ineffective when said positive clutch is engaged, means including a solenoid for actuating the positive clutch, a circuit responsive to synchronizing signals for controlling operation of the solenoid, and means movable with the recording device for momentarily connecting the synchronizing signal receiver to said circuit whenever the recording device reaches a predetermined position in its travel, whereby the circuit will, through its control of the operation of the solenoid, cause said positive clutch to be engaged when said predetermined position is reached while a synchronizing signal is being received.

9. In a facsimile recorder, means for receiving facsimile and phasing signals from a transmitter which is driven at a known speed, a recording device, a motor, a positive clutch for coupling the motor to the recording device to drive the latter at a speed synchronous with that of the transmitter, means including a gear rain and an overrunning clutch for connecting the motor to the recording device whereby the recording device is driven at less than said synchronous speed when the positive clutch is disengaged, means including a solenoid for actuating said positive clutch, a circuit responsive to phasing signals for controlling operation of the solenoid, a rotatable, non-conducting ring fixedly secured to the recording device and having a conducting segment thereon, a pair of contact members riding on said rotatable ring and adapted to momentarily connect the phasing signal receiver to said circuit when said contact members make contact with the conducting segment as the ring rotates, whereby the circuit will, through its control of the operation of the solenoid, cause said positive clutch to be engaged when said contact with the conducting segment is made while a phasing signal is being received, and locking means in said circuit for maintaining the positive clutch engaged after said contact with the conducting segment has been made and broken.

CLAYTON E. HUNT, JR.

REFERENCES CITED

The following references are of record in the file of this patent:

UNITED STATES PATENTS

| Number | Name | Date |
|---|---|---|
| 2,492,621 | Cooley | Dec. 27, 1949 |
| 2,509,730 | Dome | May 30, 1950 |
| 2,522,919 | Artzt | Sept. 19, 1950 |
| 2,543,787 | Long | Mar. 6, 1951 |